SPIRAL ERROR DETECTION CIRCUIT FOR TELEGRAPH SYSTEMS
Filed April 25, 1962
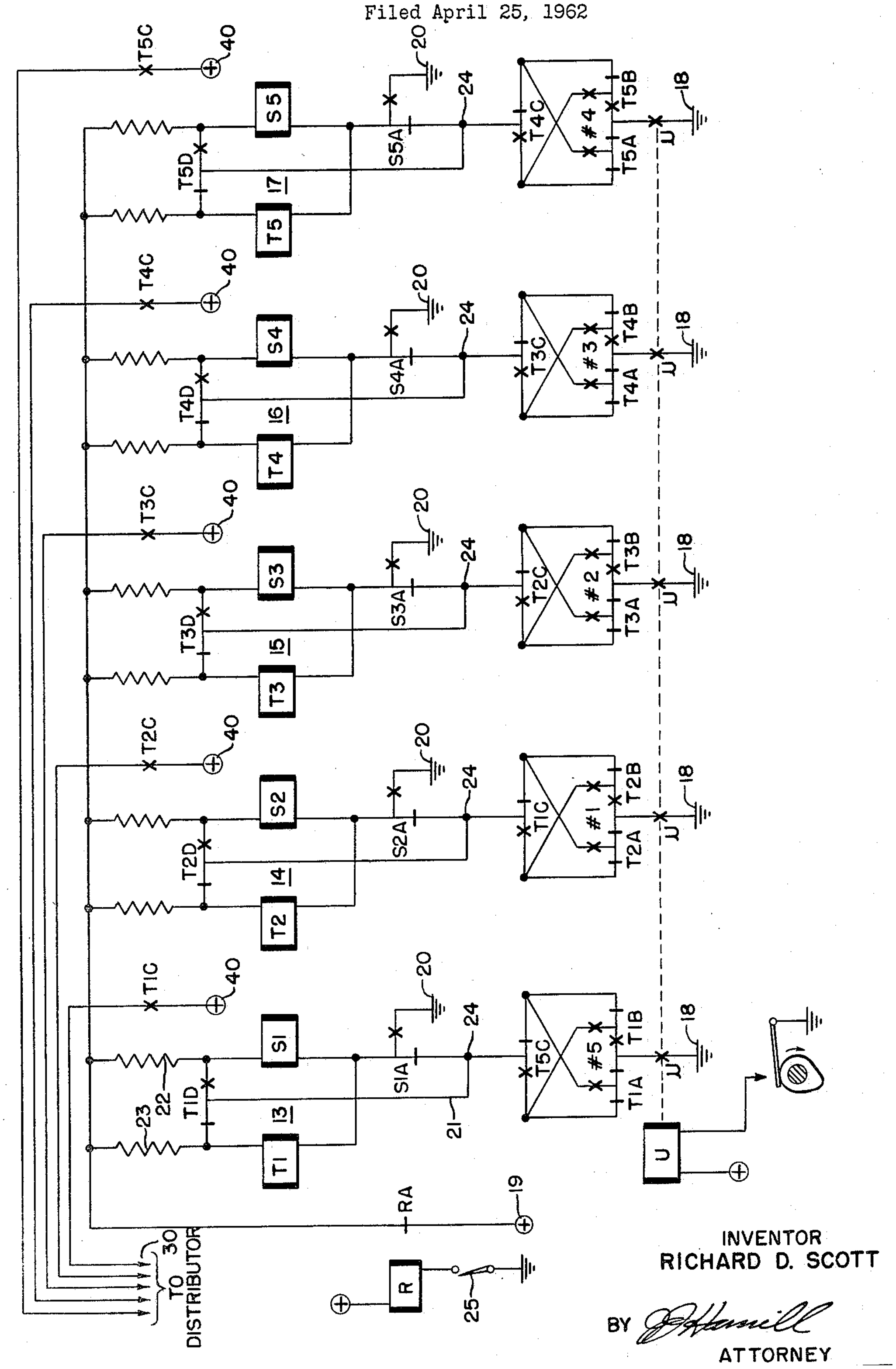
INVENTOR
RICHARD D. SCOTT
BY [signature]
ATTORNEY 3,234,510
Patented Feb. 8, 1966

3,234,510

SPIRAL ERROR DETECTION CIRCUIT FOR TELEGRAPH SYSTEMS

Richard D. Scott, Chicago, Ill., assignor to Teletype Corporation, Skokie, Ill., a corporation of Delaware Filed Apr. 25, 1962, Ser. No. 190,043
8 Claims. (Cl. 340—146.1)

This invention relates to a system for detecting errors in telegraph messages and more particularly to a system for counting the elements in different levels of succeeding telegraphic code combinations in a predetermined pattern which has been called a spiral parity counting system.

Since the advent of electronic computers and the extension of their usefulness by the transmission of the data generated by these computers by telegraphic means to distant stations, horizontal and spiral parity types of error detecting systems have been employed to assure accuracy and fidelity of the transmission.

In so called horizontal parity checking systems elements of one of two conditions, i.e. marking signals or spacing signals (generally the marking signals), in each level of a code combination are counted. The total count, over a given length of message, is compared with the total obtained at a different point in the system for the same length of message, i.e. for the same group of signals. Preferably each of the levels are separately counted and compared simultaneously.

Commonly, a numerical total for a level is not registered, but only the first order of a binary count is registered. Accordingly, if there were two errors in one level, no error would be detected, since the first order of the binary count would be the same for two errors as for no errors. This system is found to be satisfactory where the frequency of errors is low compared to the unit length of the message which is counted and checked. Such a counting system is commonly referred to as an "odd-even" count.

In the so called spiral parity checking system, a shift is made between levels after each code combination whereby the marking signal or spacing signal contained in one level of one code combination is added to the marking or spacing signal of a different level of a succeeding code combination. This total is added to the marking or spacing signal of still another level of the next succeeding character. This process is continued over the entire message. Preferably, similar and separate checks are made for each level of the code combinations. Normally, in spiral parity checking systems, the shift between levels for successive code combinations is a straight numerical shift. Thus, for five level code combinations the numerical shift may be considered as consisting of 1-2-3-4-5-1-2-etc. It will be appreciated, however, that the numerical designations of the levels are arbitrary and that any degree or order of shifting may be employed provided that the shift is such that shifting for a given code combination is uniform for all signals. The shifting or interaction of counts of elements between levels of succeeding code combinations is characteristic of spiral parity check systems whereas the absence of shifting or interacting of counts of elements between levels of succeeding code combinations is characteristic of horizontal parity check systems.

A method of detecting errors by the spiral error detecting system is disclosed in the patent issued to William R. Young, Patent No. 3,008,004, November 7, 1961. The Young patent discloses a particular system for achieving a spirally developed checking character by using a stepping switch to route each of the elements of the permutational telegraphic code combination being monitored to a plurality of binary registering devices, and thereafter moving a stepping switch forward one position so that the elements of a succeeding code combination are routed to binary storage devices associated with different levels and containing counts from these different levels of the prior registered character.

The patent to Edward E. Schwenzfeger, Patent No. 3,008,003, issued November 7, 1961, discloses a spiral parity system for performing an odd-even count of the elements of one condition (marking pulses) by changing the states of bi-stable devices, each associated with an element, during the first half of a character cycle and, then during the latter half of the character cycle by performing a second counting or shifting operation to include the count of an adjacent bi-stable device to achieve a spiral parity count. In high speed counting operations, this double counting or two-step operation is time consuming and the timing problems become acutely exacting thereby rendering the system undesirable for high speed operation.

An object of the invention is to provide an improved and simplified method and apparatus for registering elements of one of two conditions of a plurality of character codes by a spiral parity registration method.

An object of the invention is to increase the speed of operation of spiral parity error detection systems by simultaneously registering and shifting the stored intelligence in essentially a single operation rather than in two separate operations.

An object of the invention is to provide a spiral parity system for controlling the state of one bi-stable register in accordance with the instantaneous binary conditions of the element in the level of the code associated with one bi-stable register, the condition of an associated bi-stable register, and the condition of the one bi-stable register.

An object of the invention is to perform a spiral parity check over a plurality of code combinations by changing the state of frequency dividers associated with each level of the code combinations being counted by simultaneously analyzing the condition of the element being counted in a given level, the condition of the frequency divider associated with the level being counted and the condition of another frequency divider registering a prior count of elements of prior code combinations.

An object of the invention is to perform a spiral parity check over a plurality of code combinations by changing the state of a register only when the register and its associated register are in like states and the element is in the condition being counted, and when the register and its associated register are in unlike conditions and the element is in the condition not being counted.

In accordance with the invention a plurality of bi-stable devices are provided, one for each level of the code combination. Each bi-stable device alternates between one stable state and a second stable state to record an odd-even summation of the elements of one of two possible conditions over a plurality of code combinations. Each bi-stable device is controlled by a control circuit having transfer contacts settable to represent the binary condition of an element, the binary condition of a first bi-stable device and the binary condition of an associated bi-stable device. A control circuit changes the state of its associated bi-stable device whenever the binary condition of the first bi-stable device and its associated bi-stable device are alike and the condition of the intelligence being received is a marking or "1" condition and altrenatively to change the state of the bi-stable device whenever the first bi-stable device and its related bi-stable device are in unlike conditions and the condition of the intelligence being added is a spacing or "0" condition.

A complete understanding of the invention may be obtained from the following description of the error detection system, in accordance with the preferred embodiment of the invention, when read in conjunction with the accompanying drawing which is a circuit diagram showing the spiral parity system according to this preferred embodiment.

Referring now to the drawing, the preferred embodiment of the invention is shown in the familiar detached schematic diagram, wherein the make and break contacts are shown in close proximity to the relays which they control rather than in close proximity to the relays which cause their operation. The contacts are identified by the designation of the relay which causes them to change from their normal state to their opposite state.

The counting of the elements of the characters forming a message is performed by pairs of "S" and "T" relays, each pair of which constitutes a two-state, bi-stable register or memory device. A pair of "S" and "T" relays has been provided for each code level, and for the five code levels used herein, the pairs of relays have been designated generally as registers 13 to 17, and have been designated individually as relays T1, S1; T2, S2; T3, S3; T4, S4; and T5, S5. The "S" and "T" relays are interconnected to form a bi-stable or flip-flop device commonly referred to as a W-Z frequency divider, and its operation will be briefly described before describing its use in the spiral parity system. The "S" and "T" relays indicate a "1" or marking condition when they are both energized and indicate a "0" or spacing condition when they are both de-energized. Ignoring for the moment the specific paths available through the maze of transfer contacts at the lower portion of the drawing and assuming that a path has been completed from ground connection 18 to point 24, an energizing circuit for the S1 relay is completed from this ground connection 18 through the U contact and the maze of transfer contacts, through break contact S1A, now closed, coil of relay S1, and resistor 22 to a source of positive voltage 19. A locking circuit for S1 extends from ground 20, through make contact S1A, now closed, coil of S1 relay, and a resistor 22 to a source 19 of positive voltage. Relay T1 did not initially operate with relay S1 as ground connection 18 is connected over lead 21, through closed break contact T1D, and resistor 23 to positive potential 19, thus shunting the relay T1. However, when the universal contact "U" opens and breaks this shunting path, relay T1 is operated and locks through a path extending from ground connection 20, make contact S1A, now closed, coil of relay T1 and resistor 23 to positive potential 19. Thus, when universal contact "U" is closed, the S1 relay changes state if a path is available through the maze of contacts and the T1 relay assumes the same state when the contact "U" opens.

Upon the next closing of the universal contact "U" and the completion of a path through the maze of contacts, a shunting path for relay S1 extends from ground to junction 24, thence, over lead 21, make contact T1D, now closed, and resistor 22 to positive potential 19. With the release of relay S1 and the opening of universal contact "U," the relay T1 will be released because its energizing path from ground 20 is broken by the opening of make contact S1A.

Each pair of the "S" and "T" relays functions as a bi-stable counter in that whenever a path has been completed through the maze of contacts, the "S" and "T" relays change from one stable state to another stable state, i.e. from an energized to a de-energized state.

In the maze of contacts associated with register 13, there are four sets of transfer contacts, namely, No. 5 code reading contacts operable by a tape sensing pin in the fifth level, transfer contacts T1A and T1B operable by relay T1 and transfer contacts T5C operable by relay T5. These contacts each represent the condition of the factors which must be accounted for when using this spiral parity check system including bi-stable counters, namely, the condition of a first bi-stable counter which contains the previous total of all the marking elements heretofore counted in one spiral path, the condition of the element presently being counted, and the condition of another associated bi-stable counter. For example, in register 13 when the No. 5 code reading contact is in its normal state, it indicates a "0" or spacing binary condition for the element presently being sensed and counted and when in its operated state, it indicates a "1" or marking binary state. The T1A and T1B contacts indicate the present binary state of the register 13 in a similar manner, and the transfer contacts T5C indicate the present binary state of the register 15.

The code contacts Nos. 5, 1, 2, 3 and 4 are transfer contacts operated by the tape sensing pins (not shown) of a tape reader or conversely could be the transfer contacts operated during the punching operation of a tape punch. Regardless of the means of actuating the code reading transfer contacts, they indicate the condition of an element in a given level of a character.

Make contacts "U" are universal contacts that close once during each character cycle and thus furnish the clock pulse for operating those of the registers 13 to 17 which are conditioned for operation. The maze of contacts, e.g., No. 5; T1A, T1B; and T5C, constitute three separate switches for routing a clock pulse through alternative paths whenever the universal contact "U" closes and furnishes a clock pulse to change the state of a bi-stable device. That is, if a series path is available through the maze of contacts associated with the first register 13, then upon receipt of a clock pulse ("U" contact closing), the S relay changes its state and upon the ending of the trigger pulse the T relay assumes the same state as its S relay.

The maze of contacts are so arranged that four, and only four, paths are available to change the state of the "S" and "T" relays when the universal contact "U" has operated. For example, when relays T1 and S1 are in the same state as relays T5 and S5, i.e., either all four of these relays are energized or all four of these relays are de-energized, and a marking pulse is available at the code reading contact No. 5, the closing of the universal contact "U" changes the state of the S1 relay and the T1 relay assumes the same state upon the opening of the universal contact "U." Conversely, when the state of the registers 13 and 17 are unlike, e.g., the relays T1 and S1 of register 13 are energized and the relays T5 and S5 of register 17 are de-energized, and a spacing pulse is present at the No. 5 contact, the closure of the universal contact "U" causes S1 relay to change state and T1 will also change state as the universal contact "U" opens. However, if a spacing pulse were present at the No. 5 contact in the first example and a marking pulse in the second example, then the registers would not change their states.

More specifically, when registers 13 and 17 are in the de-energized state and a marking pulse is sensed by the No. 5 code reading contact, the closure of the universal contact "U" completes a path from ground 18 through a maze of closed contacts, which is as follows: make contact No. 5, break contact T1B, and break contackt T5C now closed. When the registers 13 and 17 are both energized and the No. 5 code reading contact is registering a marking condition, a path from ground 18 is completed through register 13 upon closure of the universal make contact "U," by the following closed contacts: make contact No. 5, make contact T1B and make contact T5C. When register 13 is de-energized and register 17 is energized and a spacing condition is registered at code reading contact No. 5, a path is completed from ground 18 upon closure of universal contact "U" by the following closed contacts: break contact No. 5, break contact T1A and make contact T5C. When register 13 is energized and register 17 is de-energized and a spacing condition is registered by the No. 5 code reading contact, a path will be completed from ground 18, upon closure of the universal contact "U," over the following closed contacts: break contact No. 5, make contact T1A and break contact T5C.

It should be noted that the each of the code character contacts Nos. 1 to 5 has been interconnected with the contacts of two consecutive registers 13 to 17, and by interconnecting the contacts of the fifth register 17 with the first register 13 an infinite re-entry chain is established for accomplishing the desired spiral parity registry without shifting or changing the counter condition twice in one character cycle. That is, an actual separate shifting operation has been eliminated in the present spiral parity system wherein the shifted odd-even counts are registerd directly.

In the following example, it is assumed that the entire circuit is in a state of rest with all relays released and that the information impressed on the code reading contacts Nos. 1 to 5 is as follows: mark (1), mark (1), mark (1), space (0), and space (0), respectively. After adding by Boolean algebra the "0" state of each de-energized register to the state of its corresponding code reading contact and shifting the result of this addition one place to the right, the registers 13–17 should be in the binary states 0-1-1-1-0, respectively. That is, the registers 13 and 17 are de-energized and the registers 14, 15 and 16 are energized when a second character is impressed on the code reading contacts. Assume the second character has the following elements: space (0), mark (1), mark (1), space (0), space (0). After adding the second character to the registers 13–17 and shifting the results of the additions one place to the right, the registers 13–17, respectively, will read space (0), space (0), space (0), space (0), mark (1).

The following description traces the paths through the maze of contacts during the parity counting operation for the above characters. The first character has elements mark, mark, mark, space, space which are added to the initial conditions of the registers 13–17, namely "0," "0," "0," "0," "0," and the following paths occur: When universal contact "U" closes, a path will not be completed from ground connection 18 to the S1 and T1 relays inasmuch as the path from the break contact No. 5 is opened in one direction by make contact T1A and in the other direction by make contact T5C, both the T1 and T5 relays being de-energized. Accordingly, relays S1 and T1 remain in their de-energized state.

When universal contact "U" closes, a path is completed to energize relays S2 and T2 from ground 18 via the make contact No. 1, the break contact T2B and break contact T1C. Thus, after relay S2 energizes and universal contact "U" opens, relays S2 and T2 are both energized by a path extending from ground 20 to positive potential 17 as traced hereinbefore. Accordingly, register 14 registers a marking condition.

Register 15 will be energized upon the closing of universal contact "U" through a path extending from ground 18, make contact No. 2, break contact T3B and break contact T2C. Thus, relays S3 and T3 are energized and register mark in the same way as relays S2 and T2 in register 14. Moreover, relays T4 and S4 in register 16 will both be energized and register a marking condition due to the completion of a path similar to that shown for registers 14 and 15.

Register 17 registers a spacing condition because the paths from ground 18 to its relays S5 and T5 are opened by make contact T5A and make contact T4C during the closing of universal contact "U." Thus, register 17 registers a spacing condition. Summarizing, the binary states of the registers 13 to 17 are thus seen to be to 0-1-1-1-0.

During the sensing of the second character having elements 0-1-1-0-0 the following operations take place: Relays T1 and T5 are in the de-energized or "0" condition and code transfer contact No. 5 is in the spacing condition. Therefore, when universal contact "U" closes, make contacts T1A and T5A open both paths extending from closed break contact No. 5. Therefore, relay T1 remains released and indicates a "0" condition.

At the time of closing of the universal contact "U," relay T2 is energized and relay T1 is de-energized and code reading contact No. 1 is sensing a spacing condition. Accordingly, an energizing circuit is completed from ground 18 through the maze of contacts to change the state of register 14 over the following path: Break contact No. 1, make contact T2A, and break contact T1C. Thus, ground is applied at junction 24 for shunting relay S2 in the manner previously discussed. Accordingly, register 14 now records a "0" condition.

When universal contact "U" closes, relays T2 and T3 are operated from the preceding counts and code transfer contact No. 2 is registering a marking condition. Upon closure of universal contact "U," a path is completed from ground 18 to shunt relay S3 to change the state of register 15 through the following path: make contacts No. 2, make contacts T3B and make contacts T2C to apply ground to junction 24. Thus, relay S3 is shunted and after the T relay follows the S relay, register 15 will be in the "0" condition.

When universal contact "U" closes for the second character, relays T3 and T4 are operated due to their previous counts and relay T3 is sensing a marking condition. The path to shunt out relay S4 is the same as traced immediately above to shunt out relay S3. Register 16 thus assumes a "0" or spacing condition.

At the time that the universal contact "U" closes, the T5 relay is unoperated, the T4 relay is operated and the code transfer contact No. 4 is sensing a spacing condition. A path is completed from ground 18 through the maze of contacts to energize relay S4 when the universal contact "U" closes by the following route: Break contact No. 4, break contact T5A, and make contact T4C. When universal contact "U" opens relay T4 energizes and register 17 registers a "1" condition.

Summarizing, it will be seen that the first character code M-M-M-S-S when counted and placed in storage was registered as 0-1-1-1-0 and upon the addition thereto of a second character code S-M-M-S-S that the resultant register count is 0-0-0-0-1, which count is that shown to be obtained and present in the registers 13–17, inclusive.

The resulting states of the registers 13–17 after a predetermined number or block of characters constitute a spiral parity check character which is transmitted to the receiving station for comparison with a similar check character generated at a receiving station. Agreement between the spiral parity check characters indicates that the transmission of the message was correct and nonagreement between parity check characters indicates that the transmission was incorrect.

To read out the resulting states of the parity registers 13–17 after a block of characters has been counted, each of the make contacts T1C, T2C, T3C, T4C and T5C, when closed, connects positive potential from a source 40 to its respective distributor lead 30 to indicate a marking condition to a distributor (not shown). Conversely, if the "S" and "T" relays for a level are deenergized, their respective make contacts of make contacts T1C–T5C are open and supply no current to the distributor lead 30. While the parity registers 13–17 have been described in conjunction with a distributor at the transmitting station, it is believed to be manifest that the registers 13–17 could equally as well be used in conjunction with a parity check comparing device at a receiving station. Before beginning the parity checking operation over the next block of characters, it is necessary to reset all of the counters to their beginning states or "0" states to assure that at the beginning of the parity check count that all of the parity check registers 13–17 are in the same condition, namely, the spacing condition.

After transmission of the parity check character, the relay R is energized by the closure of a switch 25 thereby causing break contact RA to open and thus open the circuits of all the "S" and "T" relays that were previously energized. After resetting all of the relays to "0," the relay R is de-energized and the break contact RA closes the path to positive battery 19, thereby, permitting subsequent energization of the S and T relays during the counting of the marking pulses.

From the foregoing, the method steps of odd-even spiral counting of elements of one condition employed herein should be apparent, and they include determining the binary condition of an element, the binary condition of a first register, the binary condition of an associated register and controlling the state of the first register in accordance with these binary conditions. In this method, the binary conditions of an element and first and second associated registers are directly and coincidentally determined and result in either changing the state of a first register or leaving its state unchanged rather than changing or not changing the state of a register after a plurality of operations. Thus, there is no storing and/or shifting step present in the present method. A given register changes state only when it and its associated register are in like states and a mark is being detected in an associated level, and when it and its associated register are in unlike states and a spacing condition is being detected.

It is pointed out that while the invention has been described as odd-even counting successive elements in successive levels in the preferred embodiment, the invention is not so restricted and is applicable to various types of patterns of additions. For example, the bi-stable register 13 could add the condition of element in level 2 and condition of the register 15 in determining its own state. Similarly, register 14 could add the condition of the element in level 3 and the condition of register 17 in determining its own state. It should be apparent that each of the registers could be associated with any of the five given levels and any of the four other registers to form many different patterns of counting.

Although only one embodiment of the invention is shown in the drawing and described in the foregoing specification, it will be understood that invention is not limited to the specific embodiment described but is capable of modification and rearrangement and substitution of parts and elements without departing from the spirit of the invention.

What is claimed is:

1. Apparatus for registering an odd-even spiral count of the code elements of one binary condition over a plurality of permutative code combinations, said count being registered in a plurality of odd-even registers, one register for each level of the code combination, said apparatus comprising means for determining the binary condition of said code element in each level, means for determining the binary condition of the previous count of the register for each level and means for controlling the count of each of the registers in accordance with the odd-even summation of the binary conditions of said code element in a level, the register for that level and a second one of said registers in a single operation.

2. An error detection system for directly effecting a spiral parity count of elements in one of two conditions of a plurality of character codes, wherein each character code has a plurality of levels, comprising a first bi-stable register means for storing a cumulative odd-even count of elements of said one condition, a second bi-stable register means for storing a cumulative odd-even count of said elements of one condition in another level, first switch means operated by said first bi-stable register means for indicating the state of said first register means, second switch means operated by said second register means for indicating the state of said second register, third switch means for indicating the condition of an element of a character code to be counted, and circuit means for interconnecting said first, second and third switch means and for causing the state of said first register means to be changed when said first and second switch means are in like states and said third switch means is in a state indicative of said one condition, and when said first and second switch means are in unlike states and said third switch means is in a state indicative of the other of the two conditions.

3. Apparatus for spirally odd-even counting the elements of one of two conditions of a plurality of code combinations comprising a plurality of bi-stable registers equal in numbers to the number of levels of said code combinations each register counting an odd-even sum of elements of said one condition, a plurality of first and second transfer contacts, each of said first and second transfer contacts being operated by one of said registers to assume a state representative of the state of that register, code transfer contacts for each level of said code combination, each of said code transfer contacts being operated to assume a state representative of the condition of the element in its level, and a plurality of circuit means, each connected to a different register and having said first and said second and said code transfer contacts therein, for changing the state of the register to which said circuit means is connected when said code transfer contacts are in the state indicative of said one condition and said first and second transfer contacts are in like states, and when said code transfer contacts are in the state indicative of the other of the two states and said first and second transfer contacts are in unlike states wherein said first and second transfer contacts are operated by different registers.

4. A parity counting apparatus for spirally counting elements of one of two conditions of a plurality of code combinations comprising a plurality of bi-stable registers equal in number to the number of levels in said code combinations and each registering an odd-even count of the elements of said one condition in a given level by changing from one stable state to another stable state, a plurality of control circuits, each control circuit connected to a bi-stable register for controlling the state of that bi-stable register, a plurality of first transfer contacts, each of said first transfer contacts being operated by a bi-stable register to indicate the state of that register, each of said first transfer contacts being included in the control circuit of the register which operates them, code transfer contacts for each level of code, each of said code transfer contacts being operated to assume a state indicative of the state of the element in its level, each of said code transfer contacts being included in a predetermined control circuit, a plurality of second transfer contacts, each of said second transfer contacts being operated by a bi-stable register to indicate the state of that bi-stable register, each of said second transfer contacts being included in the control circuit of another bi-stable register, and timing means for operating each control circuit to change the state of the register to which the control circuit is connected when said code transfer contacts are in the state indicative of said one condition and said first and second transfer contacts are in like states, and when said code transfer contacts are in the state indicative of the other of the two states and said first and second transfer contacts are in unlike states.

5. Apparatus for spirally counting the elements of one of two conditions of a plurality of code combinations comprising a plurality of bi-stable devices equal in number to the number of levels of said code combinations, each bistable device recording an odd-even count of elements of said one condition by changing from one stable state to another stable state, a plurality of first switch means, each of said first switch means being responsive to a different bi-stable device for assuming a state corresponding to the stable state of that bi-stable device, a plurality of second switch means, one for each level of the code, each of said second switch means being operated for assuming a state indicative of the condition of the element in its level, a plurality of third switch means, each of said third switch means being responsive to a different bi-stable device for assuming a state corresponding to the state of the bi-stable device, and a plurality of control circuits, each connected to a different bi-stable device for controlling the state of that bi-stable device, each of said control circuits including a first pair of paths leading from said second switch means to said first switch means, a quartet of paths leading from said first switch means and combined to form a pair of paths leading into said third switch means completing a control circuit the output of which is taken from said third switch means to change the state of a bi-stable device when said first and third switch means are in like states and said second switch means is in the state corresponding to the state of the elements being counted, and when said first and third switch means are in unlike states and said second switch means is in the state corresponding to the other condition of said element wherein said first and third switch means are operated by different bistable devices.

6. A spiral parity counting apparatus for counting the elements of one of two conditions of a plurality of code combinations comprising a plurality of bi-stable devices equal in number to the number of levels in said code combinations, each bistable device recording an odd-even count of elements of one condition by changing from one stable state to another stable state, a plurality of first transfer contacts, each of said first transfer contacts being operated by a different bi-stable device to assume a state corresponding to the stable state of the bi-stable device, a plurality of code transfer contacts, one for each level of said code combination, each of said code transfer contacts being operated to assume a state indicative of the condition of an element in its level, a plurality of second transfer contacts, each of said second transfer contacts being operated by a different bi-stable device to assume a state corresponding to the state of that bi-stable device, and a plurality of control circuits, each connected to a different bi-stable device for controlling the state of that bi-stable device, a plurality of paths through each of said control circuits over which signals are applied for changing the state of the bi-stable device, to which the control circuit is connected, a first of said paths including a make contact of one of said code transfer contacts and break contacts of said first and second transfer contacts, a second of said paths including make contacts of said first transfer contacts, said code transfer contacts, and said second transfer contacts, a third of said paths including a make contact of said first transfer contacts and break contacts of said code and said second transfer contacts, and a fourth path including a make contact of said second transfer contacts and break contacts of said first transfer contacts and code transfer contacts wherein said first and second transfer contacts are operated by different bistable devices.

7. Apparatus for spirally odd-even counting the elements of one of two conditions of a plurality of code combinations comprising a plurality of bi-stable counters equal in number to the number of levels of said code combinations, each counter counting by an odd-even summation of elements of said one condition, a plurality of first and second transfer contacts, each of said first and second transfer contacts being operated by one of said counters to assume a state representative of the state of that counter, a plurality of code transfer contacts one for each level of said code, means for operating each of said code transfer contacts to cause the said code transfer contacts to assume a state representative of the condition of the element in its respective level, and a plurality of circuit means including said first, said second, and said code transfer contacts, each of said circuit means connected to a different bistable counter for supplying an input pulse to change the state of the counter to which it is connected when said code transfer contacts are in the state indicative of said one condition and said first and second transfer contacts are in like states, and when said code transfer contacts are in the state indicative of the other of said two conditions and said first and second transfer contacts are in unlike states wherein said first and second transfer contacts are operated by different counters.

8. Apparatus for spirally odd-even counting the elements of one of two conditions of a plurality of code combinations comprising a plurality of bi-stable electromagnetic relay pairs equal in number to the number of levels in a code combination, said relay pairs being energized and de-energized at the termination of a ground pulse to indicate odd and even counts, respectively, a plurality of first and second transfer contacts, each operated by a relay pair to assume a state representative of the state of that relay pair, code transfer contacts for each level of the code combination, each of said code transfer contacts being operated to assume a state representative of the condition of the elements in its level, and a plurality of circuit means, each of said circuit means connected to a relay pair and having said first and second and said code transfer contacts therein for furnishing a ground pulse to change the count in the relay pair to which the circuit means is connected when said code transfer contacts are in the state indicative of said one condition and said first and second transfer contacts are in like states and when said code transfer contacts are in the state indicative of the other of said two conditions and said first and second transfer contacts are in unlike states, said first and second transfer contacts in each of said circuit means being operated by different relay pairs.

References Cited by the Examiner

UNITED STATES PATENTS 3,008,003 11/1961 Schwenzfeger ------- 178—23.1

ROBERT C. BAILEY, *Primary Examiner.*

MALCOLM A. MORRISON, *Examiner.*